L. T. ARGO.
PITTER.
APPLICATION FILED JULY 26, 1916.
1,228,279.
Patented May 29, 1917.
3 SHEETS—SHEET 1.
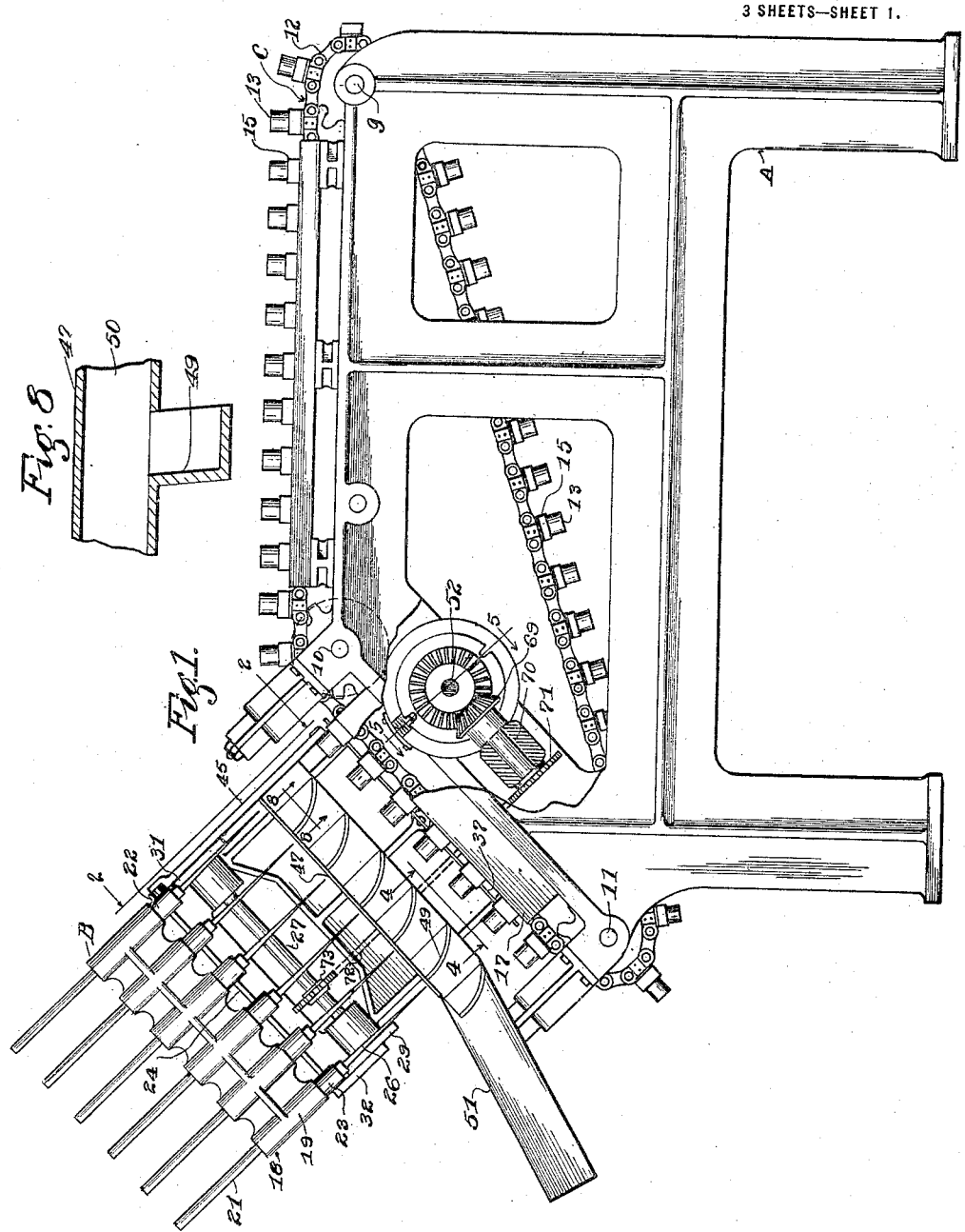
Inventor:
Lisle T. Argo.
by Edmund A. Strauss
Atty.

L. T. ARGO.
PITTER.
APPLICATION FILED JULY 26, 1916.
1,228,279.
Patented May 29, 1917.
3 SHEETS—SHEET 2.
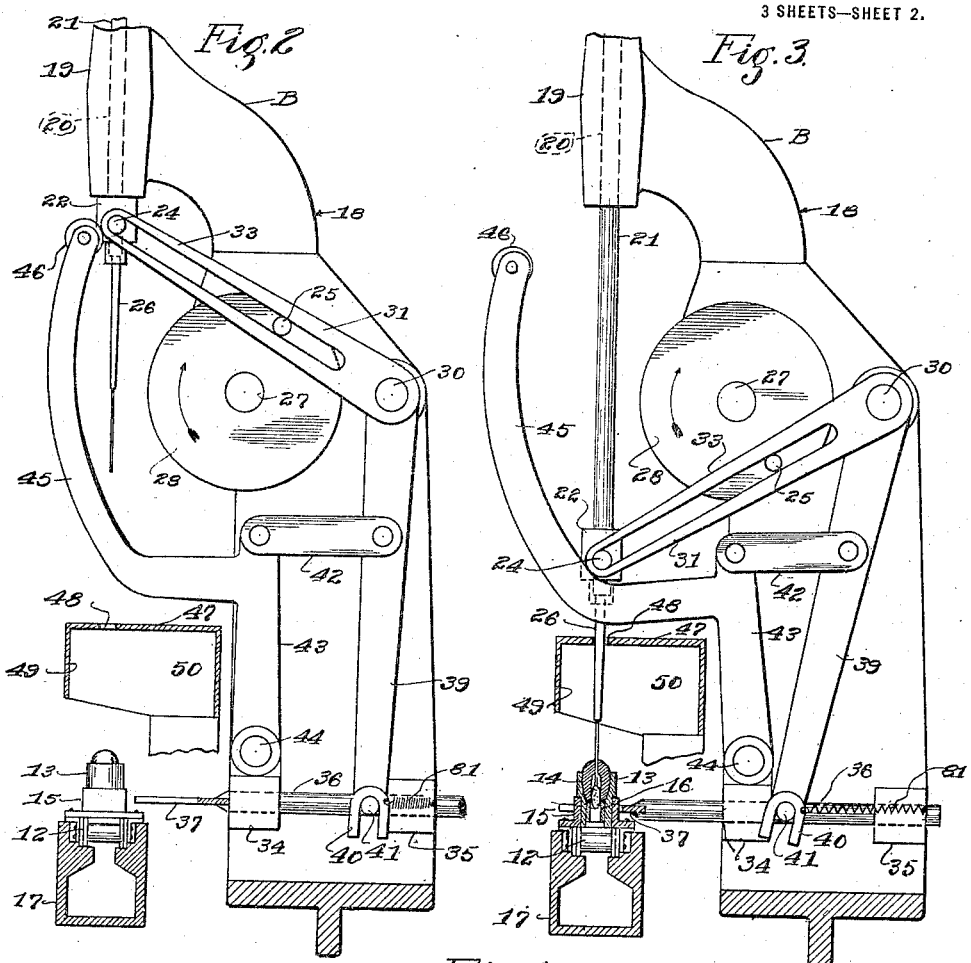
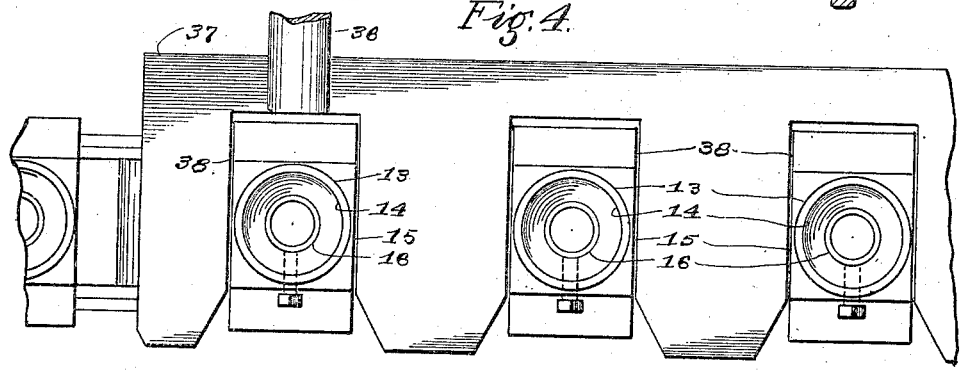
Inventor
Lisle T. Argo,
by Edward A. Strauss
Atty.

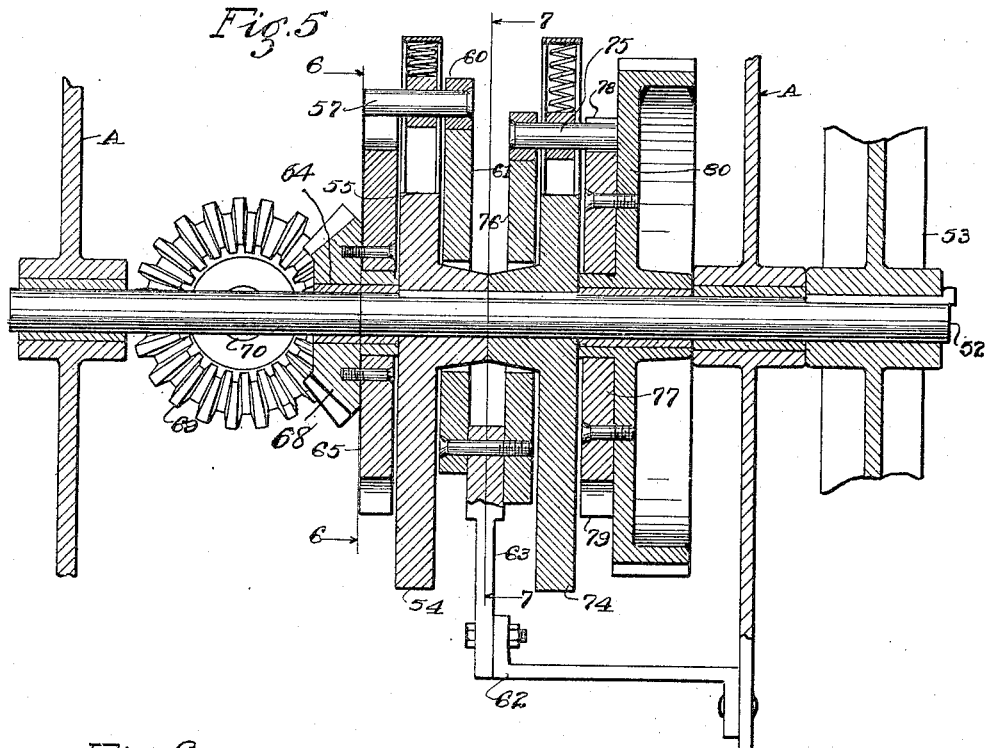
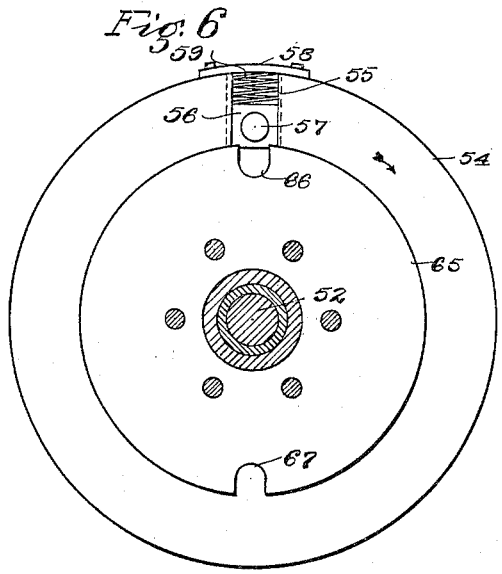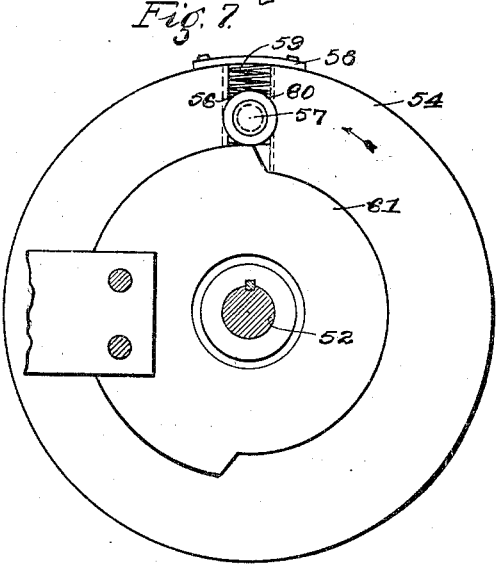

UNITED STATES PATENT OFFICE.

LISLE T. ARGO, OF LOS ANGELES, CALIFORNIA, ASSIGNOR TO CURTIS OLIVE CORPORATION, OF BLOOMINGTON, CALIFORNIA, A CORPORATION OF CALIFORNIA.

PITTER.

1,228,279.  Specification of Letters Patent.  Patented May 29, 1917.

Application filed July 26, 1916. Serial No. 111,433.

*To all whom it may concern:*

Be it known that I, LISLE T. ARGO, a citizen of the United States, residing at Los Angeles, in the county of Los Angeles and State of California, have invented new and useful Improvements in Pitters, of which the following is a specification.

This invention relates to a pitter, and pertains especially to a machine for removing the pits from fruit, such as the stones from olives.

The objects of this invention are, first, to provide a pitter which is equipped with a conveyer for feeding the fruit to a position to be operated upon by pitting punches; second, to provide fruit holding means on the conveyer and means for alining the latter with the pitter punches; third, to provide fruit releasing means for removing the fruit from the punches on withdrawal of the latter from the conveyer; fourth, to provide a discharge chute for the pitted fruit which operates in conjunction with the fruit releasing means.

In addition to the broader features of design, there are certain specific details of structure whereby ease of manipulation, speed of operation, and efficiency in pitting are secured.

I accomplish these objects by means of the embodiment of my invention illustrated in the accompanying drawing, in which:

Figure 1 is a side elevation of a complete pitter with a portion of the framework broken away and parts of the operating mechanism shown in elevation in section.

Fig. 2 is a section as seen on the line 2—2 of Fig. 1.

Fig. 3 is a section similar to Fig. 2, but with the pitter punch shown in position removing the pit from an olive.

Fig. 4 is an enlarged fragmentary section as seen on the line 4—4 of Fig. 1 showing the alining member.

Fig. 5 is an enlarged section of the operating mechanism as seen on the line 5—5 of Fig. 1, but with the clutches shown in a different operative position in order to more clearly illustrate the mechanism.

Fig. 6 is a section as seen on the line 6—6 of Fig. 5.

Fig. 7 is a section as seen on the line 7—7 of Fig. 6.

Fig. 8 is a fragmentary section as seen on the line 8—8 of Fig. 1.

Referring more particularly to the drawing, "A" indicates a framework upon which the operative parts of the mechanism are mounted. A pitting punch mechanism is indicated by "B". A conveyer for feeding fruit to the pitter punches is indicated by "C". Disposed between the conveyer "C" and the pitter punches in their upper position is a discharge chute which is provided with fruit releasing means.

The frame "A" is preferably formed of cast iron and provided with bearings in which are mounted shafts 9, 10, and 11. Upon shafts 9, 10 and 11 are mounted sprocket wheels, the teeth of which engage a sprocket chain 12. Upon links of the sprocket chain are mounted fruit holding cups 13.

In the machine shown herein the cups are constructed to hold olives. Each cup is, therefore, provided with a cavity 14 of the shape of an olive so that when the olive is disposed therein with the stem end downward it will be snugly held in position. Herein I have shown a construction whereby the cups may be changed in order to adapt the machine for different sizes of olives. Each cup 13 is cylindrical on its exterior and reduced in section at its lower end. A socket 15 is secured to the chain 12 and has a bore which receives the end of the cup at the reduced diameter. The cup 13 has a bore 16 communicating with the cavity 14 and providing means through which the pit of the olive may be forced as the pitter punch pushes it from the olive.

In order to provide a support for the conveyer as it passes beneath the punches I have provided a guide 17 which is mounted on the frame and has a channel in which the chain moves. Suitable shoulders are provided in the channel upon which the chain rests. The chain is operated by a means which moves it intermittently so that when the punches descend and engage the fruit, removing the pits therefrom, the chain is stationary. Upon withdrawal of the punches from the conveyer the latter is moved an amount sufficient to position unpitted fruit below the punches. This intermittent operating mechanism will be later described.

Upstanding from the frame of the machine is a head 18 upon which the pitter punches and the operating mechanism therefor are mounted. The upper portion of the head 18 is provided with guides 19 for the pitter punches. These comprise enlargements provided with bores 20 in which are slidably mounted the pitter punch shanks 21. Each pitter punch shank is provided with a socket, the end sockets being indicated by 22 and 23. Extending through the sockets is a rod 24 tying the punch shanks together so that they will all move in unison, and projecting beyond the end sockets to form pintles. The pitter punches 26 are preferably detachably mounted in the shanks.

Journaled in the head 18 is a shaft 27 and upon the opposite ends of this shaft are mounted disks 28 and 29. A crank pin is mounted upon each disk, the one upon disk 28 being indicated by 25. Pivotally mounted upon a shaft 30 which is secured to the head 18, are levers 31 and 32. Each of these levers are of similar form, and lever 31 is provided with a longitudinally extending slot indicated by 33.

The crank pin 35 rides within slot 33.

Mounted in the slot 33 and adjacent its end is the shaft 24. The lever 32 is similarly constructed and is engaged with the other end of shaft 24. Upon rotation of the shaft 27 the levers 31 and 32 will be oscillated. The mechanism is such that with uniform rotation of the shaft 27 a slow return movement of the punches 26 is secured.

The head 18 is provided at each end with guide members 34 and 35 which have bores in alinement with each other. The axes of these bores are arranged transverse to the path of movement of the punches. Disposed within the bores for reciprocation are guide rods 36. The rods 36 are secured to an alining plate 37 so that reciprocation of the rods will cause reciprocation of the alinement plate. In the alining plate are notches 38, one formed for each of the fruit holding means so that when the conveyer stops with a cup positioned below a punch and the alinement plate is projected, it will engage the sockets 15, the latter being positioned in the notches 38, thereby alining the cups so that upon the descending of the pitter punches they will pierce the olive, strike the pit, forcing the latter out of the stem end and through the aperture 16. Alinement must be made in order to protect the punches from engaging some portion of the cup and breaking the latter, or from missing the pits, and thereby failing to force the latter out.

For operating the alinement plate I have provided mechanism located on head 18. This mechanism comprises a lever 39 pivotally mounted on shaft 30 and having at its free end a yoke 40 which straddles a pin 41 mounted on the guide rod 36. Pivotally mounted intermediate the ends of the lever 39 is a link 42. The link 42 is pivotally secured to an angle lever 43, the latter being fulcrumed upon the head as indicated by 44. Extending from the end of the lever 43 is an arcuate arm 45 having at its upper end a roller 46. The arm 45 is so positioned that the end of lever 31 will ride upon the inner surface of the arm; the roller 46 provides for gentle engagement of the lever 31 and the arm 45. As the lever 31 moves from its upper position shown in Fig. 2 to its lower position shown in Fig. 3, the arm 45 is forced outwardly, thereby pulling the lever 39 forwardly and moving the alinement plate 37 into position to engage the fruit holding means.

A punch as it descends, moves quickly, pierces the end of the olive as shown in Fig. 3, engages the pit and forces the latter out of the stem end of the olive and through the aperture 16. The punch then begins to return slowly and withdraws the olive which sticks to the punch. In order to release the olive from the punch I have provided a fruit releasing means and also means for discharging the released fruit. This means comprises a chute 47. The chute 47 is open on one side. The upper wall thereof is extended to form a fruit releasing plate, and is provided with apertures 48 for each of the punches. As a punch descends it passes through an aperture 48, pits the olive, carries the latter upwardly until it abuts the upper wall of the chute, where it is withdrawn from the punch.

Extending from the side of the chute are vanes 49 which are curved so that the fruit drops upon being released from the punch upon a van 49 and then rolls to the rear into the chute passage 50. The passage 50 is unobstructed and the fruit passes freely to the discharge end 51 of the chute and is received in suitable receptacles.

The intermittent operating means comprises a shaft 52 which is journaled in the frame, and has secured thereto a pulley 53 or other suitable operating means. Keyed upon the shaft 52 is a disk 54. Disk 54 has a radial slot 55 in its periphery. Mounted in this slot for reciprocating movement is a shoe 56 which carries a clutch pin 57. A strap 58 closes the end of slot 55 and is secured to the disk 54 by any suitable means such as screws. Mounted intermediate the strap and block 56 is a compression spring 59 which tends to hold the shoe 56 in its lowest position.

Mounted upon the inner end of pin 57 is a roller 60 which rides upon the surface of a cam 61. Cam 61 has means securing it to the frame of the machine to hold it stationary. This means comprises a bracket 62 secured to the frame, a bar 63 secured to the bracket and screws or other means for securing the cam to the bar 63.

It is obvious that upon rotation of the shaft 52 and disk 54 the pin 57 will be moved radially with respect to the shaft. Mounted upon a bushing 64 which in turn is idly mounted upon the shaft 52 is a disk 65. Disk 65 has two slots in its periphery at diametrically opposite points indicated by 66 and 67. Assuming that disk 65 is in the position shown in Figs. 5 and 7, the clutch pin 57 will be out of engagement with the disk 65, but upon rotation in the direction of the arrows shown in Figs. 6 and 7, the pin completes half of a revolution riding upon the high portion of the cam. During this portion of the revolution the pin is unclutched from disk 65, and the latter remains stationary, upon reaching the low portion of the cam, the pin will be forced inwardly by the spring 59 and into the slot 67, thereby clutching the disk 65 and rotating the latter one-half revolution until the pin is again moved outwardly by the high portion of the cam, thereby moving the pin out of the slot and allowing the disk 65 to remain idle during the next half of a revolution. Thus intermittent motion is provided.

This motion is transmitted to the punches by means of a bevel gear 68 which is secured to disk 65, a bevel gear 69 meshing with bevel gear 68 keyed to a shaft 70 which has mounted thereon a sprocket 71. Sprocket 71 is connected by a sprocket chain 72 to a sprocket 73 secured to shaft 27.

The conveyer is intermittently operated by a similar mechanism which comprises a disk 74 keyed to the shaft 52 and having mounted therein a pin 75 for radial movement. The pin 75 rides upon a cam 76 which is fixedly secured to the bar 63, thereby holding it stationary. A disk 77 is idly mounted upon the shaft 52 through the interposition of a sleeve, and is provided with diametrically opposite slots 78 and 79. The rotation of the shaft causes the pin 75 to clutch disk 77, rotate the latter, and then release the same, and later engage the disk again, thereby intermittently rotating the disk. Secured to the disk 77 is a spur gear 80 which meshes with a spur gear mounted on shaft 10, thereby intermittently operating the conveyer.

The operation of the punches and conveyer is properly timed for coöperative movement. In using the machine, operators place olives in the cups with the stem end of the olive downward. These cups are preferably filled while the chain is stationary. The chain is then moved by the machine and the next series of cups are filled. The operator continues to fill the cups as they are presented before him. The filled cups are carried beneath the punches. When the chain stops, the punches begin to descend, the alinement plate 37 properly alines the cups. The punches force the pits from the olive, then withdraw from the conveyer carrying the olives with them. The olives are released from the punches as they are engaged by the plate 47. The fruit then drops upon vanes 49 and rolls into the discharge chute. Before movement of the vane the alinement plate is again withdrawn by spring and the machine is ready for further operation.

What I claim is:

1. A pitter, comprising a frame, a conveyer provided with fruit holding means mounted thereon, a pitting punch mounted on said frame, means for moving said conveyer to position the fruit for engagement by said punch, means for actuating said punch to force the pits out of the fruit, an alinement member mounted on said frame arranged to position said fruit holding means in alinement with said punch, and means to operatively move said alinement member.

2. A pitter, comprising a frame, a conveyer provided with fruit holding means mounted thereon, a pitting punch mounted on said frame, means for moving said conveyer to position the fruit for engagement by said punch, means for actuating said punch to force the pit out of the fruit, a discharge chute for pitted fruit disposed adjacent said punch, means for releasing fruit from said punch, and a trough on said chute disposed to catch the released fruit and guide it into said chute.

3. A pitter, comprising a frame, a conveyer provided with fruit holding means mounted thereon, a pitting punch mounted on said frame, means for moving said conveyer to position the fruit for engagement by said punch, means for actuating said punch to force the pit out of the fruit, a discharge chute for pitted fruit disposed adjacent said punch, means for releasing fruit from said punch, and a trough extending laterally from said chute and communicating therewith for catching pitted fruit and guiding the same into said chute, said trough provided with a fruit releasing wall through which said punch passes.

4. A pitter, comprising a frame, a conveyer provided with fruit holding means mounted thereon, a pitting punch mounted on said frame, means for moving said conveyer to position the fruit for engagement by said punch, means for actuating said punch to force the pits out of the fruit, an alinement member mounted on said frame arranged to position said fruit holding means in alinement with said punch, means to operatively move said alinement member, and a fruit releasing means disposed to engage the fruit on withdrawal of said punch.

5. A pitter, comprising a frame, a conveyer provided with fruit holding means mounted thereon, a reciprocating pitting punch mounted on said frame, a slow return mechanism for actuating said punch, means for intermittently moving said conveyer whereby the latter remains stationary while said punch is pitting the fruit, an alinement member mounted on said frame arranged to position said fruit holding means in alinement with said punch.

6. A pitter, comprising a frame, a conveyer provided with fruit holding means mounted thereon, a reciprocating pitting punch mounted on said frame, a slow return mechanism for actuating said punch, means for intermittently moving said conveyer whereby the latter remains stationary while said punch is pitting the fruit, an alinement member mounted on said frame arranged to position said fruit holding means in alinement with said punch, and means to operatively move said alinement member.

7. A pitter, comprising a frame, a conveyer provided with fruit holding means mounted thereon, a reciprocating pitting punch mounted on said frame, a slow return mechanism for actuating said punch, means for intermittently moving said conveyer whereby the latter remains stationary while said punch is pitting the fruit, an alinement member mounted on said frame arranged to position said fruit holding means in alinement with said punch, means to operatively move said alinement member, a fruit releasing means disposed in the path of said punch and arranged to be abutted by the fruit on withdrawal of the same from the conveyer.

8. A pitter, comprising a frame, a conveyer provided with fruit holding means mounted thereon, a reciprocating pitting punch mounted on said frame, a slow return mechanism for actuating said punch, means for intermittently moving said conveyer whereby the latter remains stationary while said punch is pitting the fruit, an alinement member mounted on said frame arranged to position said fruit holding means in alinement with said punch, means to operatively move said alinement member, a fruit releasing means disposed in the path of said punch and arranged to be abutted by the fruit on withdrawal of the same from the conveyer, a discharge chute for the pitted fruit provided with fruit releasing means disposed in the path of said punch.

9. A pitter, comprising a frame, a conveyer provided with up-standing cups for holding fruit, a pitting punch mounted on said frame, means for intermittently moving said conveyer, a reciprocating alinement member arranged to engage said cups and position the same with respect to said punch, means for moving said alinement member into engagement with said cups when the conveyer is stationary, and means for actuating said punch.

10. A pitter, comprising a frame, a conveyer provided with upstanding cups for holding fruit, a reciprocating pitting punch mounted on said frame, a slow return mechanism for actuating said punch, means for intermittently moving said conveyer whereby the latter remains stationary while said punch is pitting the fruit, a reciprocating alinement member arranged to engage said cups and position the same with respect to said punch, means for moving said alinement member into engagement with said cups when the conveyer is stationary, and means for actuating said needle.

11. A pitter, comprising a frame, a conveyer provided with upstanding cups for holding fruit, a reciprocating pitting punch mounted on said frame, a slow return mechanism for actuating said punch, means for intermittently moving said conveyer whereby the latter remains stationary while said punch is pitting the fruit, a reciprocating alinement member arranged to engage said cups and position the same with respect to said punch, means for moving said alinement member into engagement with said cups when the conveyer is stationary, a fruit releasing means disposed to engage the fruit on withdrawal of said punch.

12. A pitter, comprising a frame, a conveyer provided with upstanding cups for holding fruit, a reciprocating pitting punch mounted on said frame, a slow return mechanism for actuating said punch, means for intermittently moving said conveyer whereby the latter remains stationary while said punch is pitting the fruit, a reciprocating alinement member arranged to engage said cups and position the same with respect to said punch, means for moving said alinement member into engagement with said cups, a fruit releasing means disposed to engage the fruit on withdrawal of said punch, a discharge chute for the pitted fruit provided with means for releasing the fruit from said punch.

In witness that I claim the foregoing I have hereunto subscribed my name this 19th day of July, 1916.

LISLE T. ARGO.

Copies of this patent may be obtained for five cents each, by addressing the "Commissioner of Patents, Washington, D. C."